US011109442B2

(12) United States Patent
Cui et al.

(10) Patent No.: US 11,109,442 B2
(45) Date of Patent: Aug. 31, 2021

(54) DYNAMICALLY ADJUSTING A NETWORK INACTIVITY TIMER DURING USER ENDPOINT MOBILITY STATES

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Erie Lai Har Lau, Redmond, WA (US); Guangtian Liu, Austin, TX (US); Jessalyn Cheng, Sammamish, WA (US); Sangar Dowlatkhah, Alpharetta, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/047,967

(22) Filed: Jul. 27, 2018

(65) Prior Publication Data

US 2020/0037391 A1    Jan. 30, 2020

(51) Int. Cl.
*H04W 76/38* (2018.01)
*H04W 4/02* (2018.01)
*H04W 8/02* (2009.01)
*H04W 76/36* (2018.01)

(52) U.S. Cl.
CPC .......... *H04W 76/38* (2018.02); *H04W 4/027* (2013.01); *H04W 8/02* (2013.01); *H04W 76/36* (2018.02)

(58) Field of Classification Search
None
See application file for complete search history.

(56) References Cited

U.S. PATENT DOCUMENTS

| 7,680,478 | B2 | 3/2010 | Willars et al. |
| 8,385,350 | B2 | 2/2013 | Shahidi et al. |
| 8,611,825 | B2 | 12/2013 | Gerber et al. |
| 9,307,569 | B2 | 4/2016 | Kodali et al. |
| 9,313,812 | B2 | 4/2016 | Bangolae et al. |
| 9,713,197 | B2 | 7/2017 | Kim et al. |
| 9,794,973 | B2 | 10/2017 | Kim et al. |

(Continued)

*Primary Examiner* — Sai Aung
*Assistant Examiner* — Liem H. Nguyen
(74) *Attorney, Agent, or Firm* — Amin, Turocy & Watson, LLP

(57) ABSTRACT

Example methods, apparatus, systems, and machine-readable mediums for dynamically adjusting a network inactivity timer during user endpoint mobility states are disclosed. An exemplary system includes a radio network including one or more base nodes, a network controller and network resources allocable to user endpoints and communications therewith. The system further including a first one of the user endpoints co-located with a vehicle and configured to determine mobility state information in correspondence with travel of the vehicle and of the first one of the user endpoints, the first one of the user endpoints utilizing an inactivity timer to release network resources allocated to the first one of the user endpoints. The network controller of the system is in communication with the first one of the user endpoints to update a value for the inactivity timer in correspondence with network policy data and the mobility state information.

20 Claims, 8 Drawing Sheets

(56) References Cited

U.S. PATENT DOCUMENTS

| | | | |
|---|---|---|---|
| 2005/0192046 A1* | 9/2005 | Harris | H04W 8/22 455/552.1 |
| 2008/0014959 A1* | 1/2008 | Karlsson | H04W 76/38 455/455 |
| 2010/0144363 A1* | 6/2010 | De Rosa | H04W 72/0486 455/452.1 |
| 2012/0324041 A1* | 12/2012 | Gerber | H04L 67/26 709/217 |
| 2013/0194941 A1* | 8/2013 | Lu | H04W 76/27 370/252 |
| 2013/0194991 A1* | 8/2013 | Vannithamby | H04L 1/0026 370/311 |
| 2014/0016614 A1* | 1/2014 | Velev | H04W 4/70 370/331 |
| 2014/0044029 A1* | 2/2014 | Chou | H04W 52/0254 370/311 |
| 2014/0247811 A1* | 9/2014 | Singh | H04W 36/32 370/332 |
| 2014/0295820 A1* | 10/2014 | Kim | H04W 52/0216 455/418 |
| 2015/0142983 A1* | 5/2015 | Yilmaz | H04L 67/1095 709/227 |
| 2015/0327167 A1 | 12/2015 | Ljung | |
| 2015/0365997 A1 | 12/2015 | Jeong et al. | |
| 2015/0382298 A1 | 12/2015 | Muller et al. | |
| 2016/0088677 A1 | 3/2016 | Sridharan | |
| 2017/0150549 A1* | 5/2017 | Olsson | H04W 76/38 |
| 2017/0156164 A1* | 6/2017 | Chami | H04L 67/303 |
| 2017/0311278 A1* | 10/2017 | Adjakple | H04W 68/005 |
| 2018/0092155 A1* | 3/2018 | Hong | H04W 48/20 |
| 2018/0242197 A1* | 8/2018 | Iwai | H04W 28/12 |
| 2019/0021017 A1* | 1/2019 | Nagaraja | H04W 72/042 |
| 2019/0075426 A1* | 3/2019 | Nomura | G06Q 30/0261 |
| 2019/0191483 A1* | 6/2019 | Ryoo | H04W 12/0433 |

* cited by examiner

DYNAMICALLY ADJUSTING A NETWORK INACTIVITY TIMER DURING USER ENDPOINT MOBILITY STATES

FIELD OF THE DISCLOSURE

This disclosure relates generally to wireless communication networks and latency sensitive devices and, more particularly, to dynamically adjusting a network inactivity timer during user endpoint mobility states to adjust for user endpoint application requirements.

BACKGROUND

With the emergence of mobile networks, mobile devices are increasingly being utilized to provide mobile application usage and network data communications to users while the users are traveling. Devices using mobile networks have been expanded from mobile smart phones, and now include in-vehicle devices that may provide various functionalities to connected vehicles. Use of these devices can impose large strains on mobile networks and consume valuable bandwidth and resources. For example, a user endpoint that maintains a network connection through a radio bearer may consume network resources even if the device is not actively exchanging packets on the network. Additionally, the user endpoint may use additional power to maintain this radio bearer. A radio network may request that the user endpoint go idle if the endpoint has not exchanged packets on the network for an amount of time. However, causing the device to idle and release the radio bearer may cause a signaling storm if repeatedly performed. For example, on radio bearer reestablishment, the user endpoint performs radio resource control (RRC) signaling to request RRC connection establishment and radio bearer reactivation, which introduces additional signaling and latency. This may adversely affect the user endpoint if an application requires low latency during usage, such as applications used by connected vehicles and other real-time data applications.

SUMMARY

Using various embodiments, dynamically adjusting a network inactivity timer during user endpoint mobility states may be performed during a network communication session so that a user endpoint (e.g., a device, such as a mobile smart phone, connected car console or heads up device, or other computing device) may utilize a proper inactivity timer to maintain or release network resources depending on requirements of the user endpoint. During use of a mobile network (e.g., a cellular network, such as a 3G, 4G, 4G LTE, 5G, etc. cellular network), a user endpoint may utilize radio resource control (RRC) signaling to establish a communication session with the network, for example, through signals exchanged with base stations (e.g., access points) of the network. The user endpoint may then activate a radio bearer with the base node and exchange packets on the mobile network through the radio bearer.

Cellular networks may release radio bearers and idle devices if the device has not used the network for data exchange for an amount of time. In such cases, user endpoints that are idled have their radio bearer with the network torn down so that network resources may be freed for use with another endpoint, thereby conserving radio network resources and providing power savings for the user endpoint that is idled. In order to determine the amount of time until radio bearer teardown and device idling, the network may utilize an inactivity timer that may dictate how long the device may maintain use of a network resource (e.g., a radio bearer channel for data communication) without exchanging packets on the network prior to causing the device to idle. User endpoints, such as those in a vehicle traveling at speed, may vary data transmission and latency requirements. Thus, unnecessary teardown and reactivation of a radio bearer may introduce unwanted latency and cause extensive signaling during user endpoint mobility.

Using a mobility state of the user endpoint, such as a speed, direction, and/or location of travel, the cellular network and/or the user endpoint may dynamically adjust their inactivity timer. The dynamic adjustment may provide longer inactivity timers until timeout and idling of the user endpoint where the user endpoint is traveling at speed and/or utilizing real-time data applications (e.g., connected car or vehicle applications). Conversely, the inactivity timer may be set with a lower timer value where the vehicle is idling, parked, and/or using applications that are not latency sensitive (e.g., a social network application, email messaging application, or other application that may not require real-time data for proper data processing and output). The inactivity timer value may be adjusted at the network level based on a network device, such as a network controller that receives the mobility state, or may be done by the user endpoint after detecting the mobility state.

In order to adjust the value of the inactivity timer, the network controller or user endpoint may utilize a network policy for inactivity timer values that determine the length of an inactivity timer based on the mobility state of the user endpoint. The value may further be based on additional information, including network connectivity information, signal diagnostics, available resources, and/or performance conditions of the cellular network transmitting the cellular technology signal (e.g., 3G, 4G, 4G LTE, 5G, etc.). The value may also be based on current behaviors and/or states of the user endpoint, such as the endpoint's applications and latency requirements of the applications. Moreover, the policy used to determine the value may be specific to a service tier for the user endpoint, which may correspond to a cellular network service purchased by the user endpoint or other tiered service. Once the timer value has been determined, a gatekeeping control function may approve or decline the selected inactivity timer value based on network considerations and the impact of the selected inactivity timer value on overall network conditions. Based on network conditions (e.g., connected users), application usage, service tier, and priority of the user endpoint, the gatekeeping control function may accept the timer value, or may establish a new timer value that is used by the network and user endpoint.

In one or more embodiments, a system includes a radio network including one or more base nodes, a network controller and network resources allocable to user endpoints and communications therewith. The system further includes a first one of the user endpoints configured for communication in the radio network, the first one of the user endpoints co-located with a vehicle and configured to determine mobility state information in correspondence with travel of the vehicle and of the first one of the user endpoints, the first one of the user endpoints utilizing an inactivity timer to release network resources allocated to the first one of the user endpoints, the network controller in communication with the first one of the user endpoints to periodically or at least episodically update a value for the inactivity timer in correspondence with network policy data and the mobility state information.

In one or more embodiments, a method includes determining, through a device co-located with a vehicle, a mobility state of the device in correspondence with travel of the vehicle and of the device, the device in communication with a network through a radio bearer, accessing a network policy comprising information for setting an inactivity timer to release the radio bearer on expiry of the inactivity timer, and updating a value of the inactivity timer in correspondence with the mobility state and the network policy.

In one or more embodiments, a system includes a connected vehicle endpoint comprising a network communication component and a connected vehicle application, the connected vehicle endpoint co-located with a vehicle and configured to determine mobility state information in correspondence with travel of the vehicle and of the connected vehicle endpoint. The network communication component of the system configured for communication in a network, the network communication component utilizing a radio bearer for network communications with a base node of the network. Additionally, the connected vehicle application of the system is in communication with a network controller for the network to periodically or at least episodically update a value for an inactivity timer in correspondence with network policy data and the mobility state information, the connected vehicle application utilizing the inactivity timer to release the radio bearer allocated to the connected vehicle endpoint.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
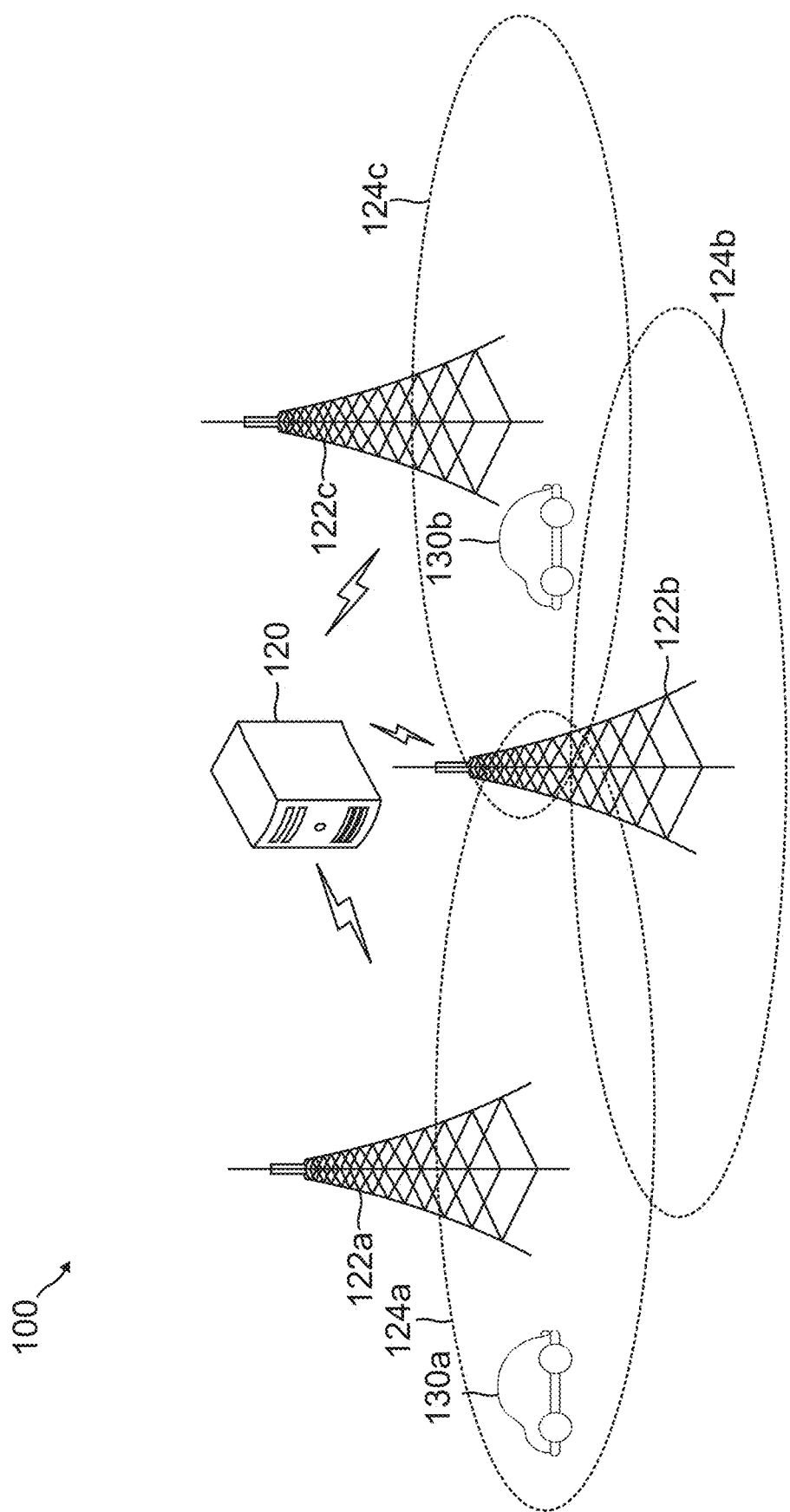
FIG. 1 illustrates an example of a network environment in which a connected vehicle device or other user endpoint may connect with a mobile network, according to an embodiment.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided for dynamically adjusting a network inactivity timer during user endpoint mobility states. Base stations of a cellular network may be used to communicate with a user endpoint and exchange data through an established radio bearer channel after radio bearer activation. Radio bearer setup and establishment may use radio resource control (RRC) messaging to establish an RRC connection. A hardware element at the base station may communicate directly with a user endpoint, such as a Node B element, eNodeB element for LTE networks, and/or a gNodeB element in 5G networks. Base stations of a cellular network are generally those base stations utilized with user endpoints (UEs, which may include cellular devices as well as connected vehicle devices discussed herein), which may be associated with vehicles (e.g., cars) and mobile phones. When radio modules of a UE, such as 3G, 4G, 4G Long Term Evolution (LTE), 5G, other 3$^{rd}$ Generation Partnership Project (3GPP)-based radio modules, and/or other radio modules, are utilized, the radio modules may establish an RRC connection and setup a radio bearer for data exchange on the network.

After establishing a communication channel with a base station node, an inactivity timer may be used to determine when a UE times out and enters an idle mode in order to conserve radio network resources and UE power. An inactivity timer may correspond to a length of time (e.g., milliseconds, seconds, minutes, etc.) that may be allowed for the device to remain inactive and not exchange data, which, at the expiration of, causes the device to enter an idle mode if the device is inactive (e.g., not exchanging data on a network). At the end of the inactivity timer, the device and network may release the radio bearer and place the UE in an idle mode. When establishing an inactivity timer for a particular communication session, the timer may be set with a particular value, which may be dynamically adjusted depending on the UE and network factors. In this regard, the timer value may be established and adjusted by one or more entities, including the UE (e.g., a mobile phone in a vehicle or a connected vehicle device) and/or a network controller on the mobile network. Once the timer value is determined, the timer value may be either transmitted to the UE by the network controller or transmitted to the network controller for confirmation by the UE.

In order to determine an inactivity timer value, the UE may first detect a mobility state of a vehicle associated with the UE, such as a car. The mobility state may be detected through a connected sensor and/or application, such as speedometer. The mobility state may also be detected through a location detection component and/or application, such as a GPS locator. Other types of sensors may also be used, including gyroscopes, accelerometers, or other movement, location, and/or motion detector. Moreover, mobility state information may include additional information, such as a location of the UE/vehicle, a direction of travel, a velocity/acceleration during travel, or other mobility related data. The mobility state information may also include nearby devices and/or elements, such as smart vehicle/city devices and applications that may provide specific data to the UE. The UE may also determine what applications are currently utilizing the network resource (e.g., performing data exchange on the network), and latency/data requirements for the application(s). For example, the UE may determine whether real-time data is required by an application or whether the application does not require low network latency for data exchange. After detection of the mobility state information (and any additional information), the information may be processed by the UE or the UE may transmit the information to the network controller for processing.

Further information may also be used to determine the inactivity timer value. For example, a network policy may include timer value profiles that establish timer values for particular mobility or location information, as well as cellular network conditions. Cellular network information may also be referred to as network or network signal information, network connectivity information, signal diagnostics, and/or performance conditions of a cellular network provided by a cellular network carrier to facilitate communications between devices over the cellular network. The cellular network information may include connected users, network resource availability, infrastructure capabilities for the network at or nearby the UE, service tiers for UEs, and/or other network statistics and resource information.

The network may include a wide area network (WAN), such as a cellular-based WAN. In the case of a cellular network, the information may be provided for the cellular-based WAN. In an aspect, mobility and/or network information may be provided as part a broadcast message to the processing entity. For example, the information may be provided and/or exchanged in an RRC message, which may be reconfigured to include mobility state information from the UE to the network controller, policy information, inactivity timer value profiles, and/or network information from the network controller to the UE. In other embodiments, other information may be included in and exchanged by a master information block (MIB) message, system information block (SIB) message, Multimedia Broadcast Multicast Services (MBMS)-based message, Evolved MBMS (eMBMS)-based message, and/or generally any message that can be transmitted (e.g., broadcasted) to and from the base stations of the cellular network and UEs within receiving range of radio signals from the base stations. Thus, mobility state information may be provided in an RRC (or other) message to the network and network policy information may be provided to the UE through a similar message.

A timer value may then be determined by the appropriate entity using the aforementioned data. The timer value may be established so that when a UE is in a high mobility state (e.g., traveling at speed) and utilizing applications that require low latency for data exchange, the timer value may be increased or set at a larger value to allow for longer before timeout and teardown of a radio bearer, thereby causing the UE to idle. Conversely, if the UE is in a parked vehicle, a vehicle stopped in traffic or at a light, and/or using applications that do not require low latency (e.g., applications that may provide static data output), the timer value may be decreased or set lower. This then causes the UE to idle faster if the UE does not exchange data on the network for the length of the inactivity timer. The timer value may then be processed by a gatekeeper process or gatekeeping control function of the mobile network. The gatekeeping control function may determine if the timer value is appropriate based on the network policy and current network conditions, as well as any additional relevant information, and may approve or deny the timer value. If approved, the timer value may be established for the UE and set at the network controller. However, if denied, the gatekeeping control function may then determine a new timer value, and may set that timer value with the UE.

Additionally, the UE and/or the network controller may continue to monitor the aforementioned mobility state information, network condition information, and other data to determine further dynamic adjustments to the inactivity timer for the particular UE and communication session used by the UE. Thus, the UE and/or network controller may continue to adjust the timer value, as previously discussed, based on changing information and data available to the UE and/or network controller. Where a new value is determined for the UE, the new timer value may overwrite or change the previous value, and the inactivity timer may be set with a new value depending on the change to the available information.

When the inactivity timer expires, the UE and/or network controller may determine whether the UE has exchanged packets on the network during that time period. That is, the UE and/or network controller may determine whether the UE has used the network resource (e.g., the radio bearer) during application usage and data exchange. If the inactivity timer has expired without utilizing the network resource, the network resource (e.g., the radio bearer) may be released and the UE may enter an idle mode. Thus, the EPS bearer established by the network for the UE may be torn down. In order to establish a data exchange channel, the UE may be required to utilize RRC signaling to again establish an RRC connection and request radio bearer reactivation for the UE.

Although the description of the present disclosure is made with respect to connected vehicle UEs and cellular networks, the techniques described herein may be applied to any wireless networks and any devices/vehicles capable of establishing connectivity in such wireless networks. By way of non-limiting example, the devices/vehicles may include, or may be included in, devices or vehicles at or near ground level (e.g., mobile devices, cars), naval-based devices (e.g., watercraft), and devices at higher altitudes (e.g., drones, aircraft, and/or any device at higher altitudes). In this regard, the techniques described herein may be utilized for different types of mobility devices.

FIG. 1 illustrates an example of a network environment in which a connected vehicle device or other UE may connect with a mobile network, according to an embodiment. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

In an embodiment, the network environment 100 is implemented to form part of a cellular network, such as a 3G, 4G, 5G, and/or other 3GPP-based cellular network, and/or a cellular network based on other cellular standards. In this regard, as an example, the description of FIG. 1 is made herein with respect to the network environment 100 providing a cellular network. However, in some examples, the network environment 100 may be additionally or alternatively implemented to form part of a satellite communication network, microwave radio network, and/or other wireless networks.

The network environment 100 includes a cellular network carrier 120, base stations 122a-c, and UEs 130a-b. Cellular network carrier 120, base stations 122a-c, and UEs 130a-b may be in communication directly or indirectly with each other. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events.

Cellular network carrier 120 may be, may include, and/or may be a component of, a core network for communicating with user devices (e.g., UEs 130a-b) through base stations (e.g., base stations 122a-c) and managing connections of UEs 130a-b and/or other types of user devices (e.g., mobile cellular phones) to the base stations. For example, cellular network carrier 120 may be, may include, and/or may be in communication with, a mobile telephone switching office (MTSO). Cellular network carrier 120 and base stations 122a-c may be provided by a cellular or mobile network provider. Cellular network carrier 120 includes suitable logic, circuitry, interfaces, memory, and/or code that enable communications, e.g. with one or more base stations 122a-c and/or one or more UEs (e.g., UEs 130a-b), via wireless interfaces and utilize one or more radio transceivers. In this regard, cellular network carrier 120 may be dedicated to facilitate connectivity of UEs 130a-b (or other vehicles/devices) with base stations 122a-c (and/or other base stations), or may be utilized to facilitate connectivity of other vehicle devices with base stations 122a-c (and/or other base stations) during differing mobility states.

In an aspect, cellular network carrier 120 may be, may include, or may be a part of, a server (e.g., a centralized server) that can generate and distribute information to base stations 122a-c, as well as receive information from base stations 122a-c. Base stations 122a-c may then relay the information from cellular network carrier 120 to UEs 130a-b. In some cases, when UEs 130a-b are in range of cellular network carrier 120, cellular network carrier 120 may transmit information directly to UEs 130a-b (e.g., through a wired or wireless signal), such as network policy information and/or other information related to inactivity timers. In an aspect, cellular network carrier 120 may provide each of base stations 122a-c with respective network policy information (e.g., inactivity timer values and information necessary to determine a value and/or a determined inactivity timer value based on a mobility state) to be transmitted (e.g., broadcasted) to UEs 130a-b.

One or more of base stations 122a-c may include, may be a component of, and/or may be referred to as, a cell, a base node, a Node B (NB), an eNode B (eNB), gNodeB (gNB), or a Home eNB (HeNB). One or more of base stations 122a-c include suitable logic, circuitry, interfaces, memory, and/or code that enable communications, e.g. with UEs 130a-b, one of the other base stations 122a-c, and/or cellular network carrier 120, via wireless interfaces utilizing one or more radio transceivers (e.g., that include antennas). Base stations 122a-c may transmit (e.g., broadcast) messages that, if received by UEs 130a-c, facilitate determination, adjustment, and/or establishment of a timer value for an inactivity timer. The messages transmitted by base stations 122a-c may be based on information received from cellular network carrier 120. In some cases, one or more of base stations 122a-c may be mobile (e.g., mobile base stations at ground level, mobile base stations at flight altitudes, mobile naval-based base stations, etc.), in which case its position information is dynamic.

Base stations 122a-c may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. In FIG. 1, base stations 122a, 122b, and 122c have nominal coverage area 124a, 124b, and 124c, respectively. The coverage area of a base station may be different in different environments, at different altitudes, and at different frequency bands. For example, a base station may have a smaller coverage area on a rainy day than the same base station on a sunny day, e.g. due to attenuation of signals by rain. When altitudes are taken into consideration, the coverage area provided by base stations 122a-c may more appropriately be referred to as a coverage volume, with different coverage areas at different altitudes. As used herein, the coverage area and coverage volume may be referred to more generally as a coverage region, where the region may be two-dimensional (e.g., coverage area) or three-dimensional (e.g., coverage volume).

Base stations 122a-c may be in communication with cellular network carrier 120 through a backhaul network. Cellular network carrier 120 may be in direct communication with one or more of base stations 122a-c or in communication with one or more of base stations 122a-c through one or more intermediary base stations. For example, in FIG. 1, cellular network carrier 120 is in direct communication with base stations 122a-c. In other cases, a base station may be in communication with cellular network carrier 120 via one or more intervening base stations. In an embodiment, cellular network carrier 120 may determine and/or have access to signal strength statistics at different positions and/or different frequency bands. In some cases, cellular network carrier 120 may determine preferred frequency bands to be utilized based on the signal strength statistics.

UEs 130a-b may be, and/or may include, a mobile phone, a personal digital assistant (PDA), a tablet device, a computer, or generally any device that is operable to communicate wirelessly (e.g., via cellular standards using antennas) with cellular network carrier 120, and/or one or more of base stations 122a-c. UEs 130a-b may also be specific in-vehicle devices, such as connected car devices, a vehicle's console computing device, a head-up device in a vehicle, or another device that is connected to and functions with a vehicle. In an aspect, UEs 130a-b may be a device that utilizes the wireless network provided by cellular network carrier 120. In this regard, UEs 130a-b may receive radio signals from one or more of base stations 122a-c, which may be configured to provide the wireless network to UEs 130a-b. Thus, the wireless network provided by one or more of base stations 122a-c may be configured for communication with UEs 130a-b based on mobility states of UEs 130a-b UEs 130a-b include a communication unit that communicates with the mobile network provided by base stations 122a-c while within coverage areas 124a-c. The communication unit may include one or more radio transceivers (e.g., that include antennas) along with associated logic, circuitry, interfaces, memory, and/or code that enable communications, e.g. with one or more of base stations 122a-c, and/or directly with cellular network carrier 120, via wireless interfaces and using the radio transceivers. In FIG. 1, the radio transceivers of UEs 130a-b include an antenna, which may be utilized to radiate and/or receive power to communicate on a network. The antenna may be contained within a housing of UEs 130a-b (e.g., included within the housing and/or circuitry of a mobile phone), or disposed (e.g., mounted) inside or outside a housing of a vehicle. The antenna may correspond to a cellular technology (e.g., using LTE or other cellular technology communication signal), which uses the cellular radio coverage of the mobile cellular network.

In some cases, the communication unit of UEs 130a-b may include suitable logic, circuitry, interfaces, memory, and/or code that enable wired communications, e.g. with one or more of base stations 122a-c, and/or cellular network carrier 120 directly. In this regard, UEs 130a-b may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiber-optic cable, or other cable or wires that support corresponding wired network technologies. For example, UEs 130a-b may utilize wired connections to receive policy information for a network policy regarding inactivity timer determination. In other embodiments, the communication unit may send and/or receive information, including mobility state data, inactivity timer policy information, selected inactivity timer values and/or other inactivity timer related information or decisions, over a cellular technology signal/network (e.g., 3G, 4G, 5G, and/or other 3GPP-based cellular network) between one or more of base stations 122a-c.

Thus, UEs 130a-b may wirelessly communicate with other devices using wireless standards, such as the Institute of Electrical and Electronics Engineers (IEEE) 802.11 standard, Bluetooth® standard, ZigBee® standard, and/or other wireless standards; cellular standards, such as 3G, 4G, 4G LTE, 5G, and/or other cellular standards, infrared-based communication, optical-based communications, and/or other appropriate communication standards and/or protocols. In some cases, UEs 130a-b may be configured to communicate with another device using a proprietary wireless communication protocol and interface. In some cases, UEs 130a-b may be configured to interface with a wired network, such as via an Ethernet interface, power-line modem, DSL modem, PSTN modem, cable modem, and/or other appropriate components for wired communication. Alternatively or in addition, UEs 130a-b may support proprietary wired communication protocols and interfaces. UEs 130a-b may be configured to communicate over a wired link (e.g., through a network router, switch, hub, or other network device) for purposes of wired communication, e.g. such as during testing and/or setup of UEs 130a-b.

As shown in FIG. 1, the coverage areas 124a-c of base stations 122a-c may provide wireless communications while UEs 130a-b are in a mobility state, such as traveling in a direction at a speed, resting, or otherwise moving or not moving, and while UEs 130a-b use device applications for data exchange using cellular network carrier 120. The coverage areas 124a-c may represent the coverage areas of base stations 122a-c. Based on a specific position of UEs 130a-b, signal strength between UEs 130a-b and the base stations 122a-c may be different. Therefore, one or more of base stations 122a-c may be utilized by UEs 130a-b during use. For example, UE 130a may communicate using base station 122a on the cellular network while UE 130b may communicate using base station 120c. When communicating on the cellular network, RRC signaling may be used to establish an RRC connection and request radio bearer setup and establishment to exchange data packets on the cellular network. Thus, UE 120a may setup a radio bearer with base station 122a (e.g., a eNB, gNB, etc.) and UE 120b may setup a radio bearer with base station 122c.

After radio bearer setup, UEs 120a-b may continue use of the radio bearer for data exchange. In order to determine when radio bearer teardown should be performed and UEs 130a-b should idle, mobility states of UEs 130a-b may be used with an inactivity timer that may be dynamically adjusted. An inactivity timer corresponds to a timer where, after expiration of the timer, the radio bearer is released by UEs 130a-b if the radio bearer has not been used for packet exchange on the cellular network. However, if used, the channel provided by the radio bearer may be maintained by UEs 130a-b. Mobility state information may correspond to a direction, speed, and/or location of travel (e.g., velocity, acceleration, and/or geo-location), as well as other movement information. A mobility state may be determined by an on-device sensor or connected sensor for UEs 130a-b, such as an accelerometer, gyroscope, speedometer, GPS locator, or other vehicle sensor. Additionally, UEs 130a-b may monitor on-device data usage and transfer over the network provided by cellular network carrier 120. UEs 130a-b may determine data requirements and/or latency requirements by applications executing on UEs 130a-b After detection of the mobility state and application data requirements, a value for the inactivity timer may be determined. The value determination may occur at UEs 130a-b, for example, by an application or process on UEs 130a-b. In other embodiments, cellular network carrier 120 may utilize a network controller for inactivity timer determination. To determine a value for the inactivity timer, a network policy for cellular network carrier 120 may be used. For example, the network policy may include timer value profiles for the inactivity timer, which may depend on a mobility state of UEs 130a-b. The timer value determination may further be based on cellular network conditions and information, such as network signal information, network connectivity information, signal diagnostics, and/or performance conditions of a cellular network. The cellular network information may also include connected users, network resource availability, infrastructure capabilities, service tiers for UEs 130a-b, and/or other network statistics and resource information. Cellular network carrier 120 may monitor the cellular network information, which may be processed by cellular network carrier 120 and/or UEs 130*a-b* for determination of the inactivity timer value.

An inactivity timer value may be selected based on the aforementioned data, such as the latency and data requirements of UEs 130*a-b* while in a mobility state. For example, UE 130*a* may be traveling quickly through a town and may be using a connected car application that requires up-to-date mapping and traffic information. Thus, UE 130*a* may require low latency and continuous data exchange over the cellular network. The inactivity timer value for UE 130*a* may be set to a large value or increased over a previous value to compensate and provide for less frequency RRC signaling for radio bearer establishment. Conversely, UE 130*b* may be associated with a parked vehicle and used to browse a social networking application, which may only require intermittent data exchange. Thus, a low value for an inactivity timer for UE 130*b* may be determined, which may allow for release of a radio bearer and other network resources during inactivity (e.g., no packet exchange). This may lead to some latency, which may be acceptable where real-time data or low latency connections are not required. Communication of the mobility information, network policy information, and/or inactivity timer value may occur through RRC messages during the RRC connection.

Cellular network carrier 120 may further include a gatekeeping control function, mechanism, or process that may serve as a gatekeeper to limit or adjust inactivity timer values if the value would adversely affect the mobile network provided by cellular network carrier 120. For example, setting an inactivity timer value at a large value for too many devices may overly burden network capacity and resources. Thus, if a large portion or all of allowed connected users on cellular network carrier 120 request a large inactivity timer value, the network may suffer. Conversely, in times of low network load, inactivity timers may be set higher. The gatekeeping control function may therefore approve or deny a determined inactivity timer by cellular network carrier 120 and/or UEs 130*a-b*. If approved, UEs 130*a-b* may receive the approval and set the inactivity timer. However, if the number of connected users, priority of UEs 130*a-b*, application usage by UEs 130*a-b*, service tier of UEs 130*a-b*, or other information indicates that the inactivity timer value is too large or otherwise insufficient, then the gatekeeping control function may adjust or change the value and provide the newly determined value to UEs 130*a-b*.

Figure 2:
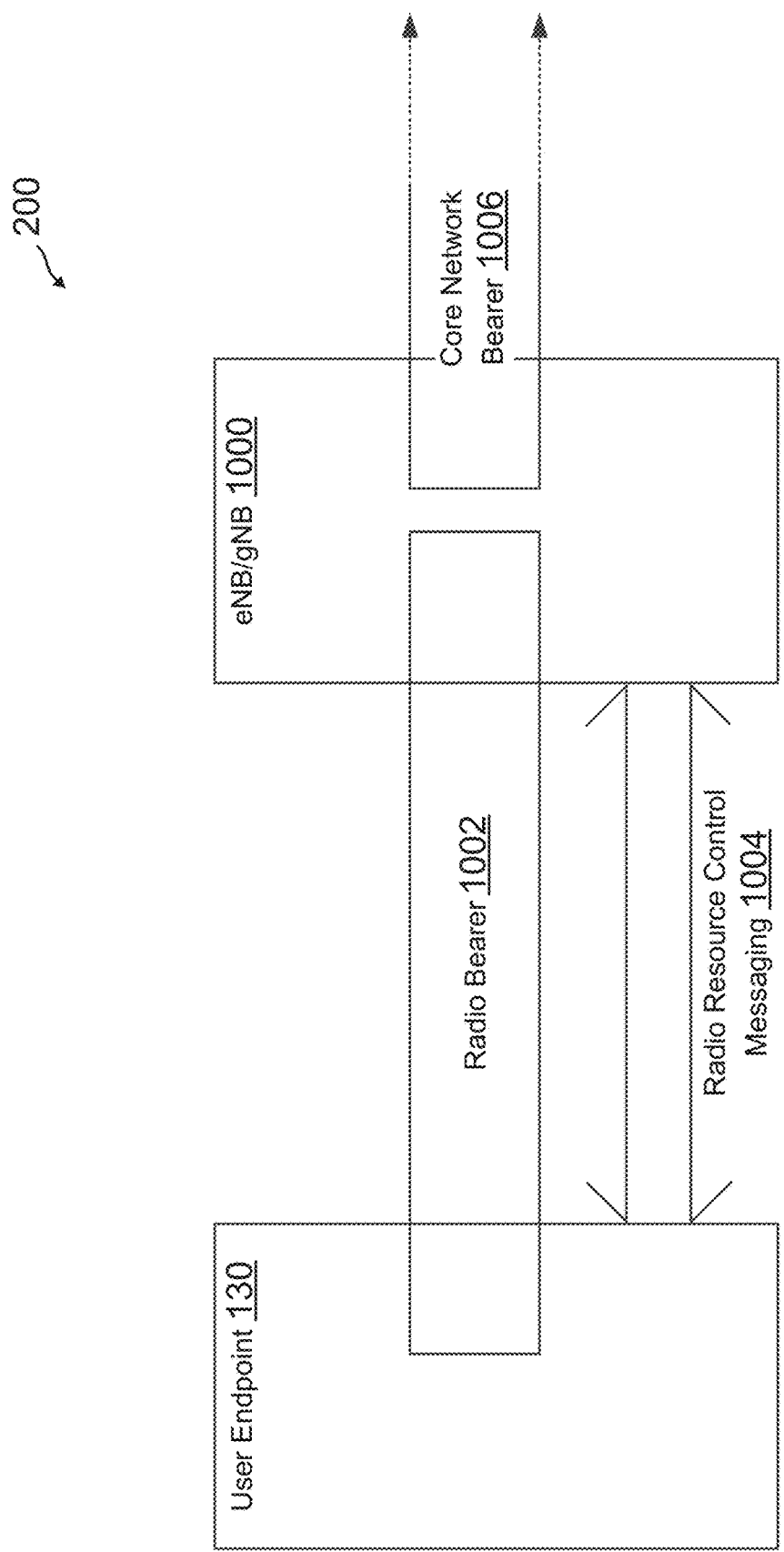
FIG. 2 illustrates an example of user endpoint connection to a base node for activating, maintaining, and tearing down of a radio bearer in a mobile network based on inactivity timer settings for network data exchange, according to an embodiment.

FIG. 2 illustrates an example of user endpoint connection to a base node for activating, maintaining, and tearing down of a radio bearer in a mobile network based on inactivity timer settings for network data exchange, according to an embodiment. Environment 200 of FIG. 2 includes a UE 130 corresponding to one of UEs 130*a-b* discussed in reference to network environment 100 of FIG. 1. Additionally, one of base stations 122*a-c* in network environment 100 of FIG. 1 may include a base node corresponding to eNB/gNB 1000 in environment 200.

Environment 200 of FIG. 2 displays an exemplary communication session where RRC signaling may be used to establish an RRC connection with a base node and setup a radio bearer channel for data exchange and network communications using a mobile cellular network. In this regard, when UE 130 is utilized, such as when an application is opened and network data exchange is requested, UE 130 may require establishment of a radio bearer as a communication channel to exchange data through the mobile network. For example, an EPS bearer may correspond to multiple element bearers that allow for communication to an external bearer and therefore the Internet. When establishing an EPS bearer, a radio bearer 1002 may be setup between UE 130 and eNB/gNB 1000. Radio bearer 1002 may then function as the communication channel for data packet exchange between UE 130 and eNB/gNB 1000. The EPS bearer may therefore include radio bearer 1002 as well as a core network bearer 1006 (e.g., an S1 and S5/S8 bearer for eNB in LTE).

Thus, UE 130 may utilize radio resource control (RRC) messaging 1004 to request setup of radio bearer 1002 and establishment of an RRC connection. RRC may correspond to a protocol that acts as a layer between UE 130 and eNB/gNB 1000. RRC messaging 1004 allows for connection establishment and release, radio bearer establishment and release of radio bearer 1002, and other data exchange. An RRC message transmitted through RRC messaging 1004 may include mobility state information, network policy information for inactivity timer value profiles, and/or inactivity timer value selection and/or approval. Using RRC messaging 1004, a network resource (e.g., radio bearer 1002) may be activated for the communication session. Once established, UE 130 and eNB/gNB 1000 may utilize an inactivity timer to determine whether to release radio bearer 1002 if data packets have not been exchanged using radio bearer 1002 for an amount of time. RRC messaging 1004 may then be used to release radio bearer 1002 in the event that the inactivity timer expires without packet exchange, as well as reestablish an RRC connection and radio bearer when UE 130 further requires a connection channel.

Figure 3:
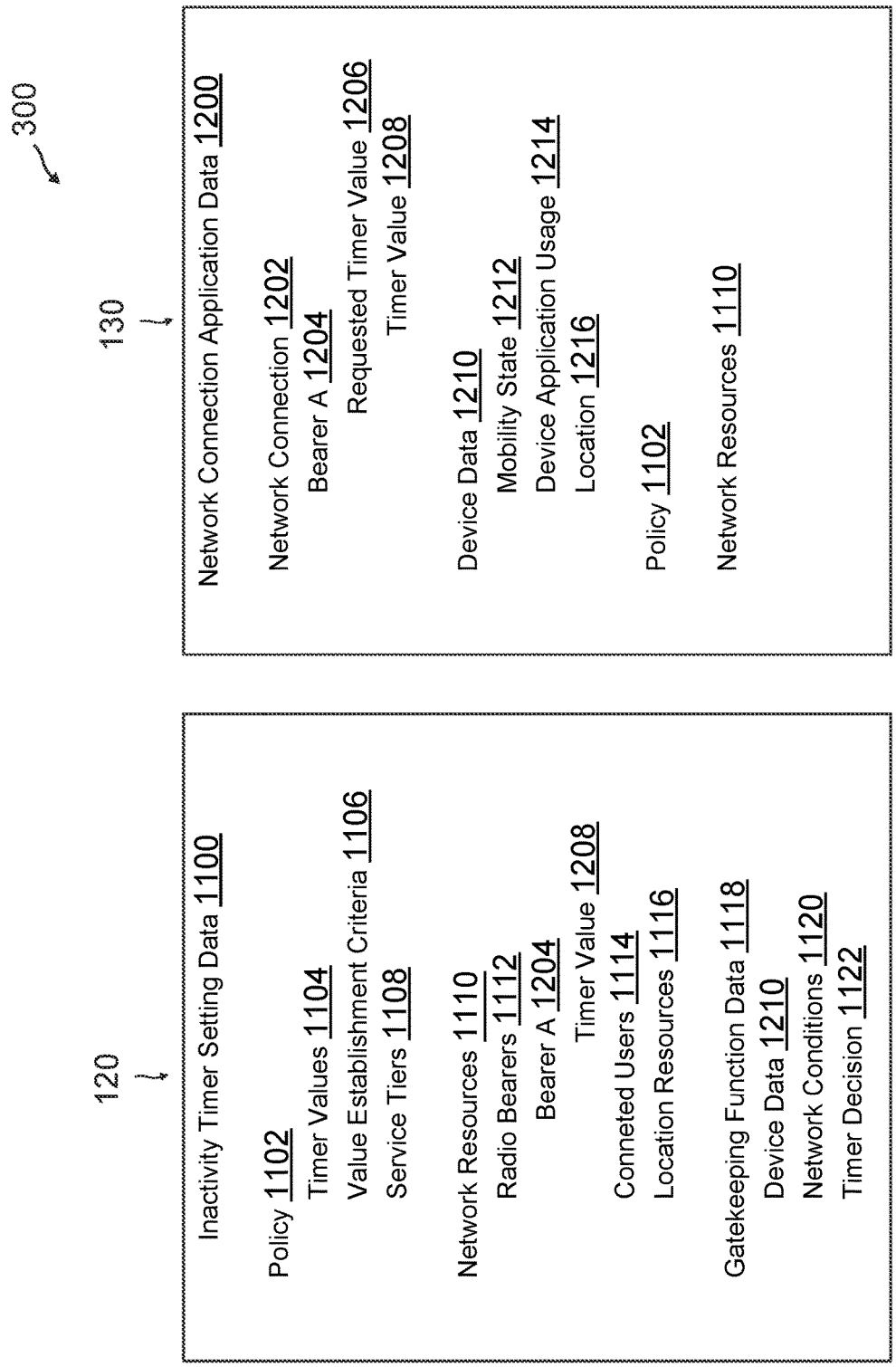
FIG. 3 illustrates a block diagram of network controller and a user endpoint for determination of an inactivity timer value based on a mobility state or other information for the user endpoint, according to an embodiment.

FIG. 3 illustrates a block diagram of network controller and a user endpoint for determination of an inactivity timer value based on a mobility state or other information for the user endpoint, according to an embodiment. System 300 includes cellular network carrier 120 and UE 130 in communication over a network, for example, using one or more of base stations 122*a-c* in network environment 100 of FIG. 1. Cellular network carrier 120 and UE 130 are discussed in reference to network environment 100 of FIG. 1 and environment 200 of FIG. 2. In this regard, cellular network carrier 120 may communicate with UE 130 to dynamically set and adjust an inactivity timer value during operation of UE 130 on a mobile network.

Cellular network carrier 120 and UE 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over the mobile network.

Cellular network carrier 120 may be maintained, for example, by a mobile services carrier, telecommunication provider, or other cellular network providing entity that provides one or more networks for use by users through one or more devices. In this regard, cellular network carrier 120 includes one or more processing applications which may be configured to interact with UE 130 to facilitate inactivity timer dynamic adjustments based on detected data. Although cellular network carrier 120 is described as being provided by a telecommunication entity, in other embodiments, cellular network carrier 120 may be maintained by or include other types of service providers providing smaller scale or different wireless networks.

Inactivity timer setting data 1100 may correspond to data determined by one or more processes of cellular network carrier 120 that is used to dynamically adjust an inactivity timer for a network resource used by UE 130 and release the resource when UE 130 is not exchanging data using the resource on the mobile network. In this regard, inactivity timer setting data 1100 may correspond to specialized data determined by hardware and/or software of cellular network carrier 120 that may be processed by one or more of cellular network carrier 120 and/or UE 130 to determine a value of the inactivity timer (e.g., a timeout value, such as a length of time that UE 130 may remain inactive and not exchanging data, after which the radio bearer/network resource is released for UE 130 and UE 130 enters an idle mode). Thus, cellular network carrier 120 may both receive and determine portions of inactivity timer setting data 1100 from UE 130 and other network devices, servers, or components. Cellular network carrier 120 may then use inactivity timer setting data 1100 for determination of a timer value.

Inactivity timer setting data 1100 includes a policy 1102 that corresponds to a network policy utilized for establishing inactivity timer value profiles and determining an inactivity timer value based on the corresponding mobility information, application usage, and network conditions. Policy 1102 therefore includes timer values 1104, which may correspond to a plurality of timer lengths or measurements (e.g., milliseconds, second, etc.). Value establishment criteria 1106 for policy 1102 may correspond to the information and conditions that are required to be met or satisfied for the selection of one of timer values 1104. Additionally, timer values 1104 may be restricted to service tiers 1108, which may dictate available values for an inactivity timer based on the services purchased by or available to particular UEs.

Inactivity timer setting data 1100 may further include information for network resources 1110 that are available to cellular network carrier 120 and used by UEs, such as UE 130. For example, network resources 1110 include radio bearers 1112 having bearer A 1204 used by UE 130 for network communications. A timer value 1208 may be set for bearer A 1204, which may be set and adjusted based on the interaction between cellular network carrier 120 and UE 130. Moreover, inactivity timer setting data 1100 may include other information for network resources 1110, which may be used for inactivity timer dynamic adjustment. For example, connected users 1114 may require network resources. Location resources 1116, such as available network nodes, base stations, and smart city components, may also be used to determine dynamic adjustment of an inactivity timer.

UE 130 may be implemented as a mobile device, in-vehicle device or other appropriate device in motion that may utilize appropriate hardware and software configured for wired and/or wireless communication with cellular network carrier 120. In other embodiments, UE 130 may include additional or different data detected by system components and/or received over a network as required. Network connection application data 1200 may correspond to data determined by one or more processes and/or components (e.g., specific hardware include within or connected to UE 130) of UE 130 that is used to dynamically adjust an inactivity timer for the network resource used by UE 130 and release the resource when UE 130 no longer requires the resource (e.g., is not exchanging data using the resource on the mobile network). In this regard, network connection application data 1200 may correspond to specialized data determined by hardware and/or software of UE 130 that dynamically adjusts bearer A 1204 used for network connection 1202. A requested timer value 1206 may be determined by cellular network carrier 120 or UE 130 utilizing available data, such as policy 1102, network resources 1110 and/or device data 1210. For example, device data 1210 may include a mobility state 1212, such as a speed and/or direction of travel, a location of travel, or other information. Device data 1210 further includes device application usage 1214 that includes data of device applications and their network data exchange and latency requirements. Device data 1210 may also include a device location 1216, which may be used to determine connectable smart components and/or available base stations and resources.

Inactivity timer setting data 1100 may also include gatekeeping control function data 1118, which may be used by a gatekeeping process or mechanism for cellular network carrier 120 to prevent overuse of network resources and undue network burden. The gatekeeping process may utilize device data 1210 from UE 130 with network conditions 1120, such as connected users, bandwidth usage, and network resources to make a timer decision 1122 for timer value 1208. Timer decision 1122 may either approve requested timer value 1206 for timer value 1208, or may deny requested timer value 1206 and set a new value with UE 130. Once timer value 1208 has been determined, timer value 1208 may be set for bearer A 1204 and activity of UE 130 may be monitored to determine whether UE 130 is inactive (e.g., has not exchange data using bearer A 1204) so that bearer A 1204 may be released. Moreover, device data 1210 and network resources 1110 may continually be processed to determine whether timer value 1208 is required to be further adjusted based on dynamic data.

Figure 4:
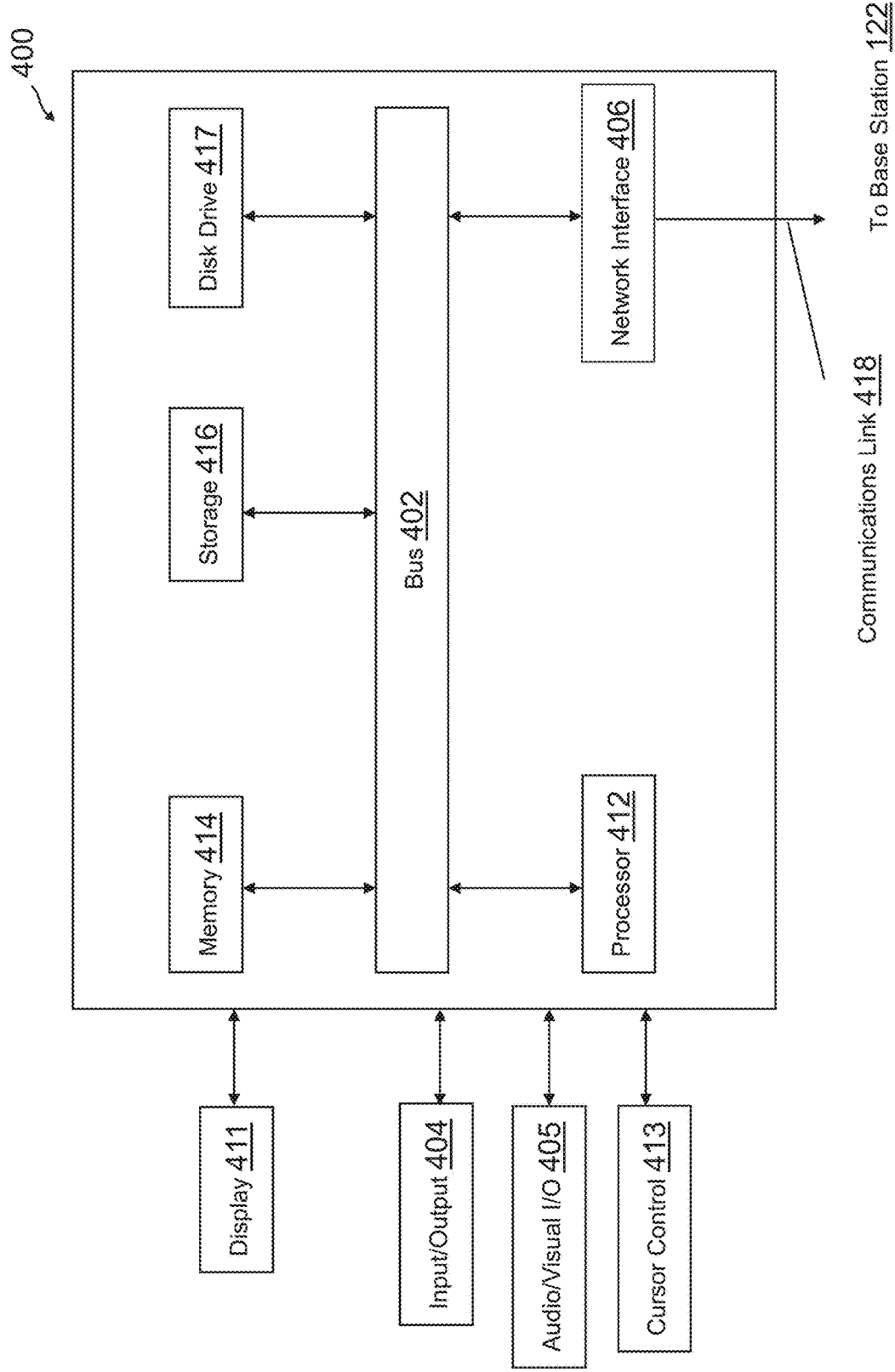
FIG. 4 illustrates a block diagram of an example of an electronic system with which one or more embodiments of the present disclosure may be implemented, according to an embodiment.

FIG. 4 illustrates a block diagram of an example of an electronic system with which one or more embodiments of the present disclosure may be implemented, according to an embodiment. In various embodiments, computer system 400 of FIG. 4 may comprise a personal computing device (e.g., smart phone, a computing tablet, a personal computer, laptop, a wearable computing device such as glasses or a watch, etc.) capable of communicating with the network. In other embodiments, a cellular network carrier or provider may utilize a network computing device (e.g., a network server) capable of communicating with the network similar to computer system 400. Moreover, one or more of the systems included within or utilized by a connected vehicle to communicate over a network may include and/or function similarly to computer system 400. It should be appreciated that each of the devices utilized by users and/or service providers (e.g., cellular network carriers) may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another device through a cellular network carrier via base station 122. In various embodiments, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In various embodiments, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 5:
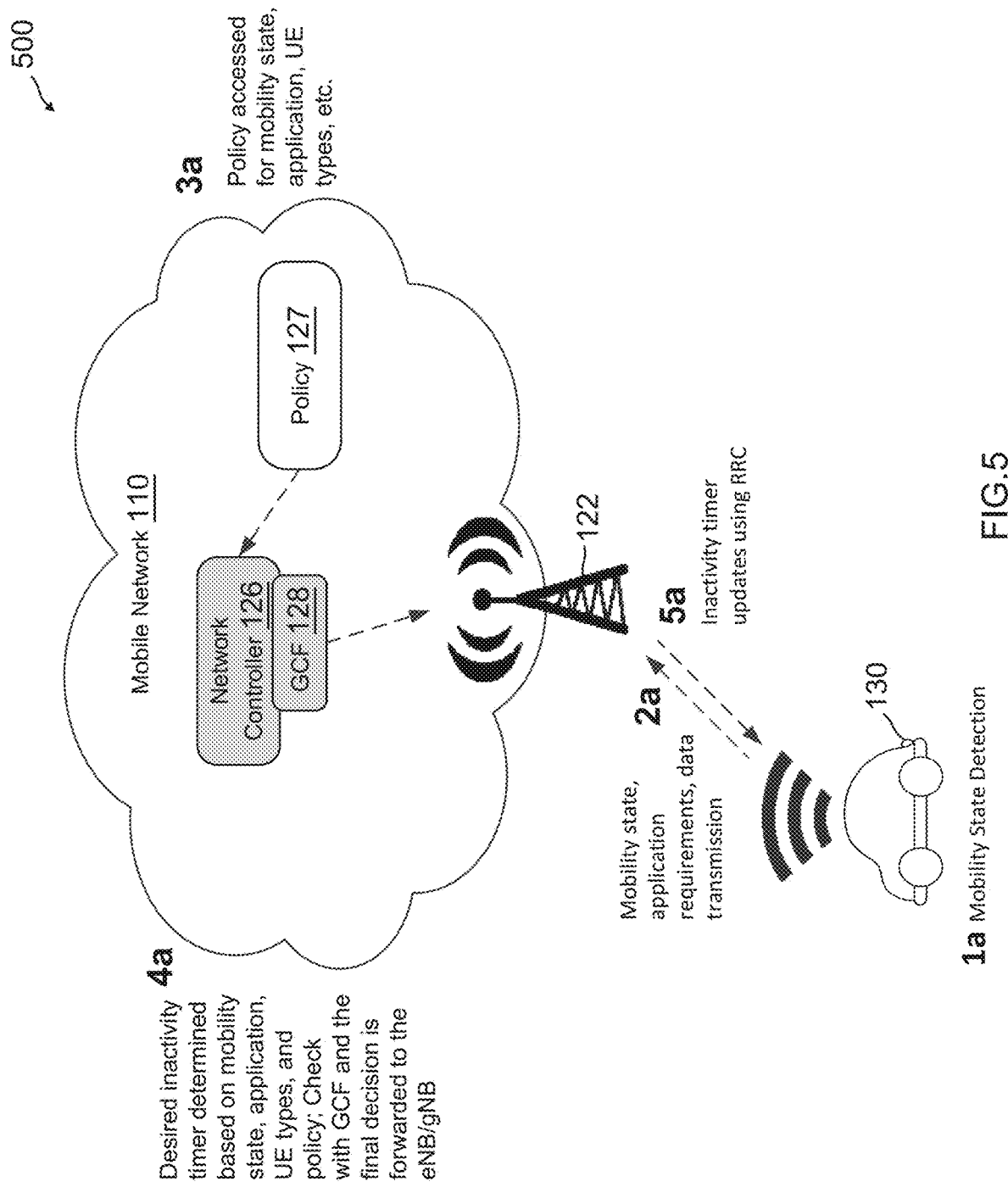
FIG. 5 illustrates an example of a network environment in which a mobile network may establish an inactivity timer value based on a mobility state or other information for the user endpoint, according to an embodiment.

FIG. 5 illustrates an example of a network environment in which a mobile network may establish an inactivity timer value based on a mobility state or other information for the user endpoint, according to an embodiment. Environment 500 includes a mobile network 110, provided by cellular network carrier 120, and UE 130 in communication over a network, for example, using one or more of base stations 122a-c in network environment 100 of FIG. 1. Cellular network carrier 120 and UE 130 are discussed in reference to network environment 100 of FIG. 1 and environment 200 of FIG. 2. In this regard, mobile network 110 may correspond to a cellular radio network that is generated by base stations 122a-c in conjunction with cellular network carrier 120. Environment 500 displays an exemplary process by which a network controller 126 for cellular network carrier 120 may determine a value for an inactivity timer based on received data.

In environment 500, the process to establish a value for an inactivity timer begins by UE 130 for a connected car device or other mobile device associated with a vehicle first detecting a mobility state at step 1a. The mobility state may be detected through the movement of the vehicle by UE 130, for example, using a movement detection sensor, speed gauge, directional sensor, and/or location detector (e.g., over time). The mobility state may also be detected by other devices, including smart city devices, cameras, motion detections or speed sensors, etc. Once detected, UE 130 further determines application requirements on UE 130 and provides the data to base station 122 through an RRC message at step 2a. Base station 122 provides the data to network controller 126, which processes the data.

Thus, at step 3a, network controller 126 accesses policy 127, which includes an inactivity timer policy for the mobility state, application data/latency requirements, UE type and tier status, and other policy information for UE 130. For example, policy 127 may be accessed and timer value profiles may be looked up based on the received data and network statistics and conditions. Policy 127 may include tables or other data arrangements for particular mobility states, network conditions, and application requirements so that a particular timer value may be determined. Network controller 126 may therefore process the information received at step 2a with policy 127 to make a determination of an inactivity timer value at step 4a. The inactivity timer value selected may then be processed using a gatekeeping control function 128, which may examine network resources, connected users, and available radio bearer resources to determine whether the timer value can be accepted or whether the timer value may cause undue network burden.

If the timer value cannot be accepted at step 4a, gatekeeping control function 128 may utilize the information of the connected resources, priority of UE 130, available network resources with the mobility state, application data/latency requirements, and UE type/tier to propose a new timer value. The new timer value may decrease the length of the inactivity timer to compensate for high network load. Conversely, if the timer value is acceptable, gatekeeping control function 128 may approve the timer value (or may increase the timer value in certain embodiments). Once decided by gatekeeping control function 128, the timer value for the inactivity timer may be set with network controller 126. The inactivity timer value may be transmitted through base station 122 to UE 130 at step 5a. UE 130 may then update the inactivity timer for UE 130, and may utilize the timer value to cause release of network resources after a period of inactivity of UE 130. UE 130 may then idle at the expiration of the inactivity timer if inactive and not exchanging data with mobile network 110.

Figure 6:
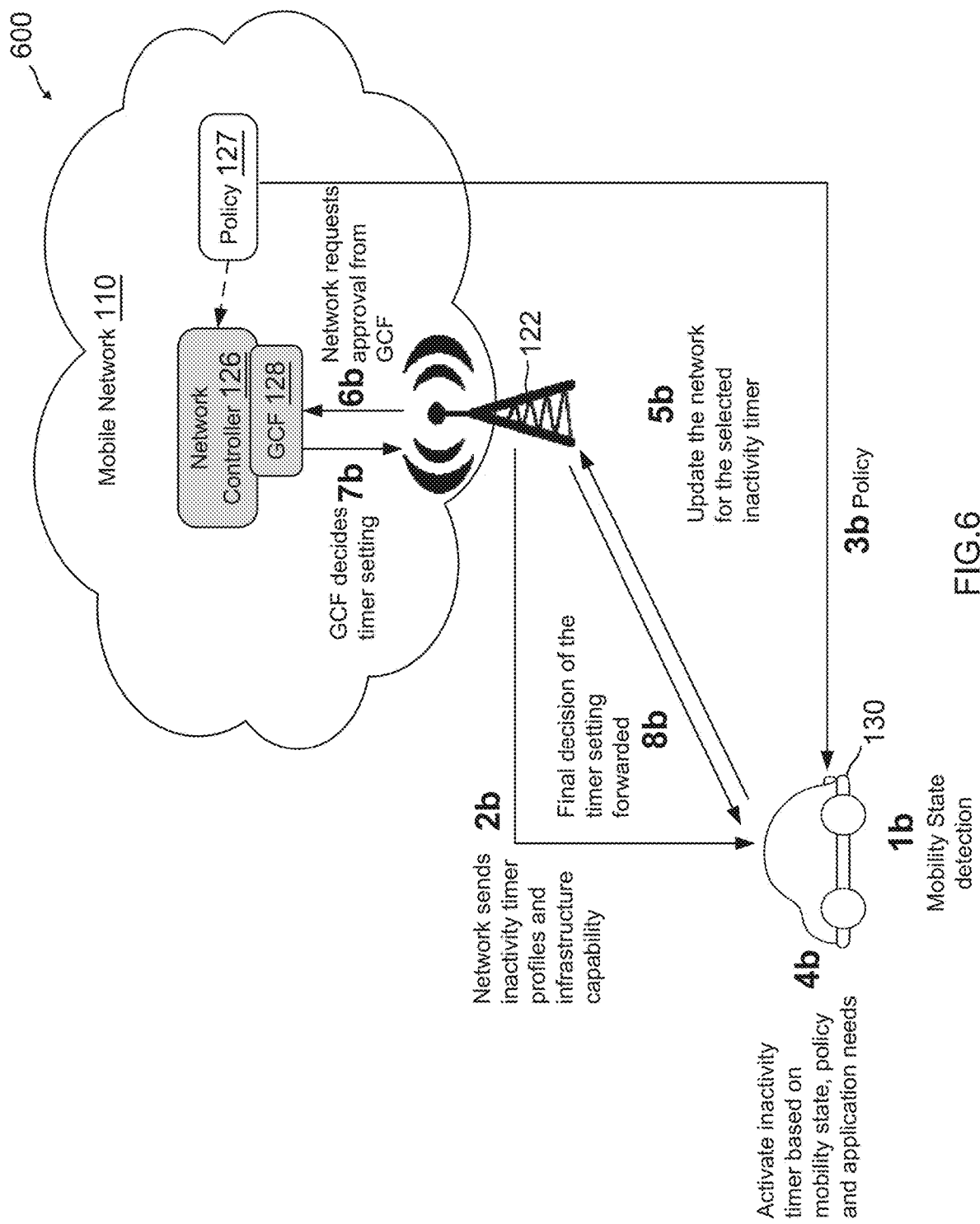
FIG. 6 illustrates an example of a network environment in which a connected vehicle's user endpoint may establish an inactivity timer value based on a mobility state or other information for the user endpoint, according to an embodiment.

FIG. 6 illustrates an example of a network environment in which a connected vehicle's user endpoint may establish an inactivity timer value based on a mobility state or other information for the user endpoint, according to an embodiment. Environment 600 includes a mobile network 110, provided by cellular network carrier 120, and UE 130 in communication over a network, for example, using one or more of base stations 122a-c in network environment 100 of FIG. 1. Cellular network carrier 120 and UE 130 are discussed in reference to network environment 100 of FIG. 1 and environment 200 of FIG. 2. In this regard, mobile network 110 may correspond to a cellular radio network that is generated by base stations 122a-c in conjunction with cellular network carrier 120. Environment 600 displays an exemplary process by which UE 130 may determine a value for an inactivity timer based on a detected mobility state and received network data and policy.

In environment 600, the process to establish a value for an inactivity timer begins by UE 130 for a connected car device or other mobile device associated with a vehicle first detecting a mobile device at step 1b. The mobility state may be detected through the movement of the vehicle by UE 130, for example, using a movement detection sensor, speed gauge, directional sensor, and/or location detector (e.g., over time). The mobility state may also be detected by other devices, including smart city devices, cameras, motion detections or speed sensors, etc. Once detected, UE 130 further determines application requirements including application data requirements and latency requirements for data communication (e.g., real-time application requirements)

Base station 122 may transmit and/or update UE 130 with inactivity timer profiles and network infrastructure conditions and availability at step 2b. This may include timer values that may be selected by UE 130, as well as the available resources for mobile network 110. Base station 122 may transmit the information through an RRC message at step 2b. Additionally, at step 3b policy 127 may be transmitted or otherwise loaded to UE 130, which includes a policy accessed for the mobility state, application data/latency requirements, UE type/tier status, and other policy information. For example, policy 127 may be utilized by UE 130 to select a timer value profile based on the received network statistics and conditions at step 4b. Policy 127 may include tables or other data arrangements for particular mobility states, network conditions, and application data/latency requirements so that a particular timer value may be determined. Thus, UE 130 may determine and activate the inactivity timer value at a device level based on the detected mobility state, received timer profiles, network infrastructure resource availability, and policy, all of which may be stored to UE 130.

At step 5b, UE 130 may update mobile network 110 with the selected inactivity timer value, for example, through an RRC message transmitted during a RRC connection. Base station 122 may receive the RRC message, which may provide the selected inactivity timer to mobile network 110 for processing by network controller 126 and gatekeeping control function 128. At step 6b, network controller 126 requests approval of the inactivity timer value from gatekeeping control function 128, which may examine network resources, connected users, and available radio bearer resources to determine whether the timer value can be accepted or whether the timer value may cause undue network burden. If the timer value cannot be accepted at step 6b, gatekeeping control function 128 may utilize the information of the connected resources, priority of UE 130, available network resources with the mobility state, application data/latency requirements, and UE type/tier to propose a new timer value. The new timer value may decrease the length of the inactivity timer to compensate for high network load. Conversely, if the timer value is acceptable, gatekeeping control function 128 may approve the timer value. Once decided by gatekeeping control function 128, the timer value for the inactivity timer may be set with network controller 126 at step 7b. The decision on the timer value (e.g., the decision by gatekeeping control function 128) may then be forwarded to UE 130 by base station 122 (e.g., through an RRC message) at step 8b. UE 130 may then set the inactivity timer, and may utilize the timer value to cause release of network resources after a period of inactivity of the timer value. UE 130 may then idle at the expiration of the inactivity timer if inactivity and not exchanging data with mobile network 110.

Figure 7:
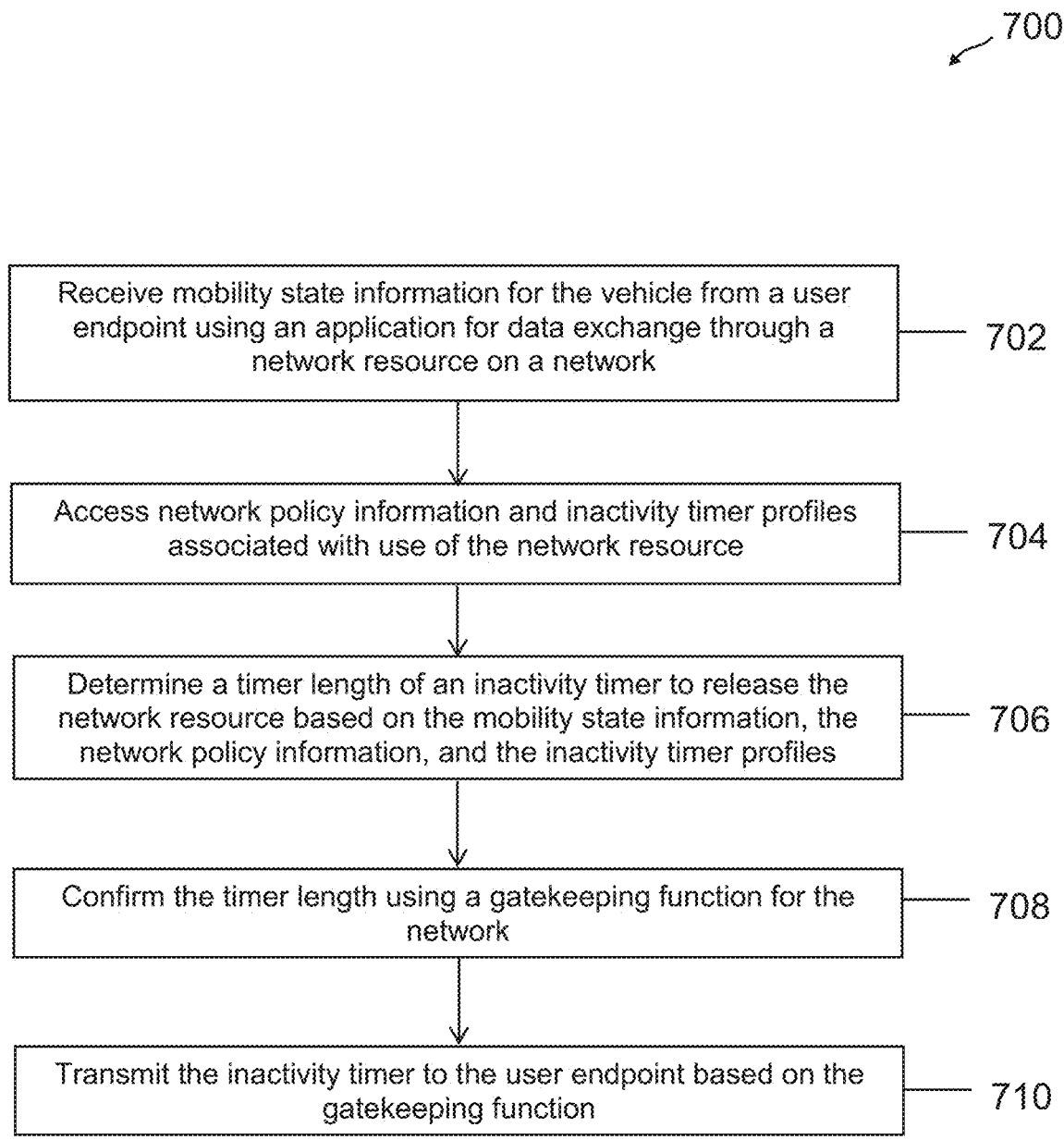
FIG. 7 illustrates a flow diagram for a mobile network to establish an inactivity timer value, according to an embodiment.

FIG. 7 illustrates a flow diagram for a mobile network to establish an inactivity timer value, according to an embodiment. Note that one or more steps, processes, and methods described herein in flowchart 700 may be omitted, performed in a different sequence, or combined as desired or appropriate.

At step 702 of flowchart 700, mobility state information for the vehicle is received from a user endpoint using an application for data exchange through a network resource on a network. Thus, a cellular network carrier's software-defined network (SDN) controller may receive this mobility state information, which may further include application usage and latency requirements. For example the mobility state information may include a travel motion of the vehicle, an in-use application on the user endpoint, data requirements for the in-use application, and/or a geo-location of the user endpoint.

At step 704 of flowchart 700, network policy information and inactivity timer profiles associated with use of the network resource is accessed. The network policy information may be associated with a plurality of different timer profiles that determine when a network resource is released at the expiration of the inactivity timer having that value, for example, if the user endpoint for the inactivity timer does not utilize the network resource and exchange packets on the network for the length of the inactivity timer length. The network policy information may be based on network resource usage on the radio network, application data requirements for the network connected user endpoints, application latency requirements for the network connected user endpoints, endpoint location for the network connected user endpoints, available smart location devices within the radio network, a speed of travel detected by the network connected user endpoints, and available base nodes of the radio network.

At step 706 of flowchart 700, a timer length of an inactivity timer to release the network resource is determined based on the mobility state information, the network policy information, and the inactivity timer profiles. This may be determined based on the mobility state of the vehicle and user endpoint, and may also be determined based on the latency requirements of the user endpoint's application(s). Moreover, this timer length may adjust the user endpoint's inactivity timer from a previous value by either increasing or decreasing the timer length.

At step 708 of flowchart 700, the timer length is confirmed using a gatekeeping control function for the network. The gatekeeping control function may utilize network conditions on the radio network, a service tier associated with the user endpoint, application usage on the user endpoint, and/or traffic conditions associated with a location of the user endpoint to determine whether the timer length is valid, or whether the timer length should be refused and a new timer length proposed.

At step 710 of flowchart 700, the inactivity timer is transmitted to the user endpoint based on the gatekeeping control function. This may include transmitting the inactivity timer length to the user endpoint using RRC messaging, as well as activating the inactivity timer at the user endpoint and with the network's controller.

After establishing the timer length for the inactivity timer, it may be determined that the inactivity timer has expired and the user endpoint has not exchanged any data on the network or otherwise used the network resource. Thus, the network resource may be released and the user endpoint may enter an idle state requiring reestablishment of the network resource through RRC signaling for an RRC connection.

However, during the use of the network resource, the user endpoint may also update the mobility state information, and cause generating of a new timer length using the processes described herein. This may be used to update the inactivity timer's length.

Figure 8:
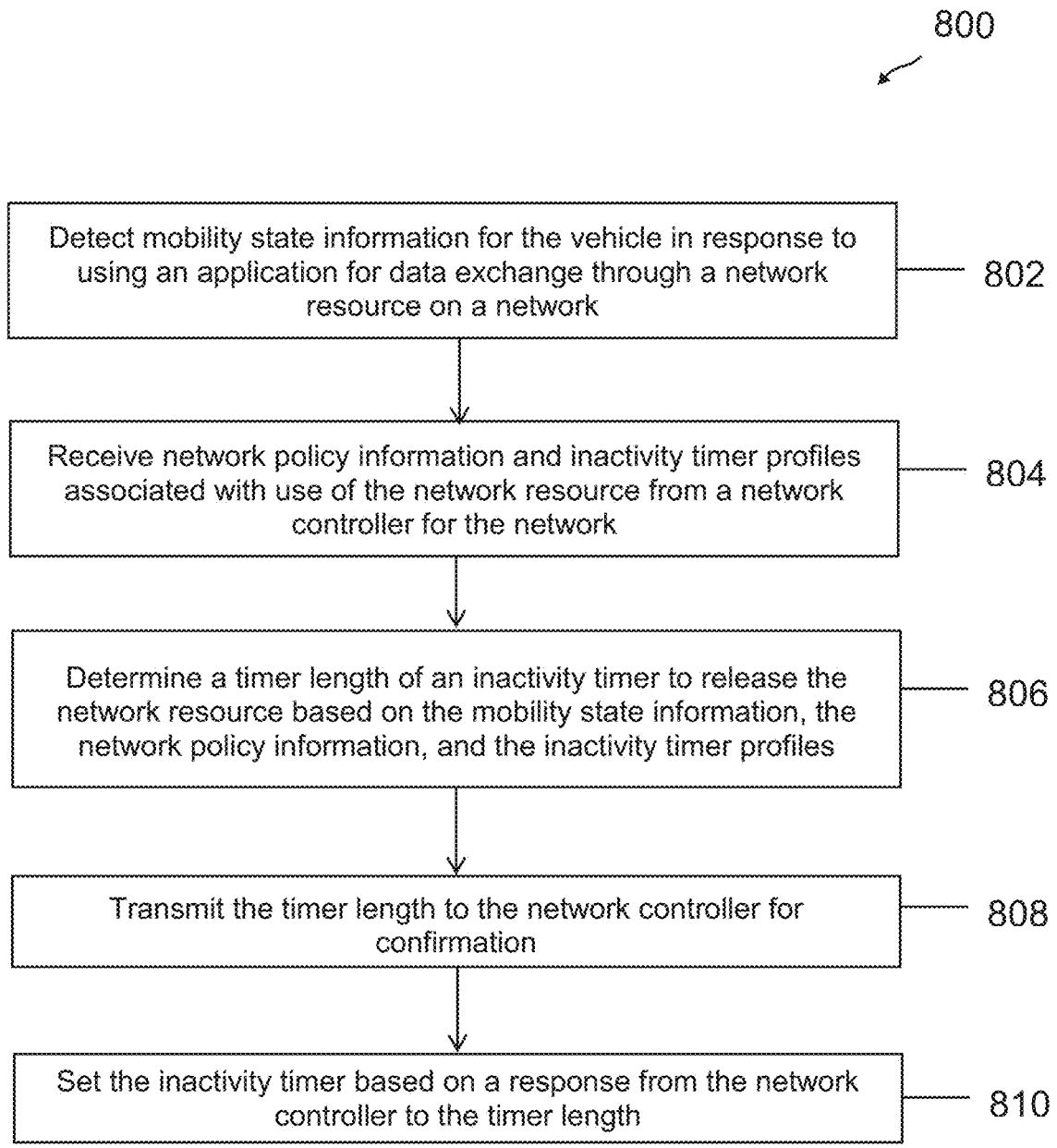
FIG. 8 illustrates a flow diagram for a connected vehicle's user endpoint to establish an inactivity timer value, according to an embodiment.

FIG. 8 illustrates a flow diagram for a connected vehicle's user endpoint to establish an inactivity timer value, according to an embodiment. Note that one or more steps, processes, and methods described herein in flowchart 800 may be omitted, performed in a different sequence, or combined as desired or appropriate.

At step 802 of flowchart 800, mobility state information for the vehicle is detected in response to using an application for data exchange through a network resource on a network, for example, by a device or other user endpoint in the vehicle. This may be detected during use of the vehicle, and may include information similar to that discussed above with reference to step 702 of flowchart 700. The device used to detect the information may be located within the vehicle, or may be connected to or a part of the vehicle, such as a connected car console device, a connected car heads up display device, or a mobile device for a user within the vehicle. The mobility state may be detected in response to an application on the device utilizing the network resource, such as a radio access bearer, to exchange data on the network.

At step 804 of flowchart 800, network policy information and inactivity timer profiles associated with use of the network resource are received from a network controller for the network. For example, the network policy may include a plurality of policy considerations for selecting one of the timer profiles based on at least one of an application latency requirement, an application data requirement, a travel parameter for the mobility state, an endpoint status tier for the user endpoint, or a device location for the user endpoint. This may be received from an RRC message.

At step 806 of flowchart 800, a timer length of an inactivity timer to release the network resource is determined, by the user endpoint, based on the mobility state information, the network policy information, and the inactivity timer profiles. This may further be determined using network condition information, which may include at least one of available network resources for a location of the user endpoint, available smart city elements connectable to the device at the location, network infrastructure associated with the location, or connected users for the network.

At step 808 of flowchart 800, the timer length is transmitted to the network controller for confirmation by a gatekeeping control function. The gatekeeping control function may either confirm or deny the inactivity timer's length. If the inactivity timer's length is denied, a request to change the first value to a second value may be sent to the user endpoint and established for the inactivity timer. This second value may be based at least on available network resources and/or radio bearers.

At step 810 of flowchart 800, the inactivity timer is set based on a response from the network controller to the timer length, which may be decided by the gatekeeping control function. The inactivity timer may be set to time out the user endpoint if the user endpoint does not exchange data on the network. For example, if the inactivity timer has expired at the end of the set value without the user endpoint using the radio access bearer for packet exchange, the user endpoint may enter an idle state and release the bearer. Additionally, the mobility state and network resources may be updated, which may cause a change to the value of the inactivity timer.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. Network equipment, comprising:
a processor; and
determining mobility state information of a vehicle comprising a user equipment capable of communicating via a communication network based on allocation, to the user equipment, of network resources associated with the communication network wherein the user equipment utilizes an inactivity timer to release the network resources, associated with the communication network, allocated to the user equipment, and wherein the mobility state information comprises a current speed of the vehicle; and
updating a value for the inactivity timer based on network policy data and the mobility state information, wherein the network policy data comprises a first policy specifying that the current speed being indicative of the vehicle being in motion corresponds to a first value for the value of the inactivity timer that represents a longer time than a second value for the value of the inactivity timer corresponding to the current speed being indicative of the vehicle being stationary.

2. The system of claim 1, wherein the mobility state information further comprises a latency requirement for communication via the communication network for an application executing on the user equipment.

3. The system of claim 2, wherein the network policy data comprises a second policy specifying that a first latency requirement corresponds to the value for the inactivity timer being set to a longer time value than the value for the inactivity timer corresponding to a second latency requirement, and wherein the first latency requirement is higher than the second latency requirement.

4. The system of claim 1, wherein the operations further comprise:
receiving an updated value for the inactivity time from the user equipment employable to update the value.

5. The system of claim 4, wherein the operations further comprise determining whether to approve the user equipment to employ the updated value for the inactivity timer based on a current network condition determined to be associated with the communication network.

6. The system of claim 5, wherein the current network condition comprises at least one of a bandwidth usage condition, a network resource availability condition, a network signal characteristic condition, or a condition with respect to a number of connected user equipment.

7. The system of claim 1, wherein the operations further comprise transmitting the value of the inactivity timer to the user equipment.

8. The system of claim 1, wherein determining the mobility state information comprises receiving the mobility state information from the user equipment.

9. A method, comprising:
determining, by network equipment comprising a processor, mobility state information of a device co-located with a correspondence with a travel of the vehicle and of the device, wherein the device is in communication with a communication network based on allocation of network resources of the communication network to the device, the device utilizes an inactivity timer to release the network resources of the communication network allocated to device, and the mobility state information comprises a current speed of the vehicle;
accessing, by the network equipment, network policy data comprising information for setting a value of the inactivity timer, wherein the network policy data comprises a first policy specifying that the current speed being at least a first current speed indicative of the vehicle being in motion corresponds to the value for the inactivity timer being set to a longer time value than the value for the inactivity timer corresponding to the current speed being at most a second current speed indicative of the vehicle being stationary; and
adjusting, by the network equipment, the value of the inactivity timer based on the mobility state information and the network policy data.

10. The method of claim 9, wherein the mobility state information further comprises a latency requirement for communication via the communication network for an application running on the device.

11. The method of claim 10, wherein the network policy data comprises a second policy specifying that a first latency requirement corresponds to the value for the inactivity timer being set to a longer time value than the value for the inactivity timer corresponding to a second latency requirement, and wherein the first latency requirement is higher than the second latency requirement.

12. The method of claim 9, further comprising transmitting, by the network equipment, the value to the device.

13. The method of claim 9, further comprising receiving, by the network equipment, an updated value for the inactivity timer from the device.

14. The method of claim 9, further comprising determining, by the network equipment, whether to approve the user equipment to employ the updated value for the inactivity timer based on current network conditions on the communication.

15. The method of claim 14, wherein the current network conditions comprise measurement conditions relating to measurement of at least one of bandwidth usage, network resources availability, network signal characteristics, or a number of connected devices.

16. A non-transitory machine-readable medium, comprising executable instructions that, when executed by a processor of network equipment, facilitate performance of operations, the operations comprising:
determining mobility state information of a user equipment co-located with a vehicle, wherein the user equipment is in communication via a wireless network based on allocation of wireless network resources to the user equipment, the user equipment utilizes an inactivity timer to release the wireless network resources allocated to user equipment, and the mobility state information comprises a current speed of the vehicle;
obtaining network policy data comprising information for setting a value of the inactivity timer, wherein the network policy data specifies that, where the current speed is indicative of the vehicle being in motion, the value for the inactivity timer is set to a longer time value than where the current speed is indicative of the vehicle being stationary; and
modifying the value of the inactivity timer based on the mobility state information and the network policy data.

17. The non-transitory machine-readable medium of claim 16, wherein the mobility state information further comprises a latency requirement for communication via the wireless network for an application running on the device.

18. The non-transitory machine-readable medium of claim 17, wherein the network policy data further specifies that a first latency requirement results in the value for the inactivity timer being larger than the value for the inactivity timer corresponding to a second latency requirement, and wherein the first latency requirement is higher than the second latency requirement.

19. The non-transitory machine-readable medium of claim 16, wherein the operations further comprises transmitting the value to the user equipment.

20. The non-transitory machine-readable medium of claim 16, wherein the operations further comprise:
receiving an updated value for the inactivity timer from the user equipment; and
determining whether to approve the user equipment to employ the updated value for the inactivity timer based on current wireless network conditions.

* * * * *